US009525664B2

(12) United States Patent
Sobel et al.

(10) Patent No.: US 9,525,664 B2
(45) Date of Patent: Dec. 20, 2016

(54) SYSTEMS AND METHODS FOR PROVIDING SECURE ACCESS TO LOCAL NETWORK DEVICES

(71) Applicant: Symantec Corporation, Mountain View, CA (US)

(72) Inventors: William E. Sobel, Jamul, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 218 days.

(21) Appl. No.: 14/193,363

(22) Filed: Feb. 28, 2014

(65) Prior Publication Data

US 2015/0249645 A1    Sep. 3, 2015

(51) Int. Cl.
 *H04L 29/06* (2006.01)
 *G06Q 50/00* (2012.01)

(52) U.S. Cl.
 CPC .......... *H04L 63/0281* (2013.01); *G06Q 50/01* (2013.01); *H04L 63/0807* (2013.01); *H04L 63/0815* (2013.01); *H04L 63/101* (2013.01); *H04L 63/107* (2013.01)

(58) Field of Classification Search
 CPC ............. H04L 63/0281; H04L 63/0815; H04L 63/101; H04L 63/107; H04L 63/0807; H04L 29/06; G06Q 50/01
 See application file for complete search history.

(56) References Cited

U.S. PATENT DOCUMENTS

| 8,245,280 | B2* | 8/2012 | Song | H04L 63/101 |
| | | | | 713/182 |
| 8,353,052 | B2* | 1/2013 | Larsson | H04L 63/0807 |
| | | | | 713/155 |
| 8,495,729 | B2* | 7/2013 | Park | H04L 29/12009 |
| | | | | 709/220 |
| 8,774,801 | B2* | 7/2014 | Ore | H04W 12/08 |
| | | | | 370/338 |

(Continued)

OTHER PUBLICATIONS

Touch, Joe et al., "The TCP Authentication Option", http://tools.ietf.org/html/draft-ietf-tcpm-tcp-auth-opt-11, as accessed Dec. 30, 2013, IETF Trust, (Mar. 2010).

(Continued)

*Primary Examiner* — Chau Le
*Assistant Examiner* — Muhammad Chaudhry
(74) *Attorney, Agent, or Firm* — FisherBroyles LLC

(57) ABSTRACT

A computer-implemented method for providing secure access to local network devices may include (1) identifying a local area network that provides Internet connectivity to at least one device within the local area network, (2) obtaining, from an identity assertion provider, (i) a shared secret for authenticating the identity of a guest user of the device and (ii) a permission for the guest user to access the device from outside the local area network, (3) storing the shared secret and the permission within the local area network, (4) receiving, via the Internet connectivity, a request by the guest user from outside the local area network to access the device, and (5) providing access to the device in response to validating the request based on the shared secret and the permission. Various other methods and systems are also disclosed.

18 Claims, 7 Drawing Sheets

(56) References Cited

U.S. PATENT DOCUMENTS

| | | | |
|---|---|---|---|
| 9,053,329 B2* | 6/2015 | Lam | G06F 21/60 |
| 9,178,883 B2* | 11/2015 | Perrone, II | H04L 63/0892 |
| 2005/0010639 A1* | 1/2005 | Long | G06Q 10/10 |
| | | | 709/204 |
| 2006/0137005 A1* | 6/2006 | Park | H04L 29/12009 |
| | | | 726/21 |
| 2006/0184530 A1* | 8/2006 | Song | H04L 63/101 |
| 2009/0113557 A1* | 4/2009 | Bodlaender | H04L 12/2803 |
| | | | 726/27 |
| 2009/0129301 A1* | 5/2009 | Belimpasakis | H04W 28/18 |
| | | | 370/310 |
| 2012/0110643 A1 | 5/2012 | Schmidt et al. | |
| 2013/0067081 A1* | 3/2013 | Liu | H04W 12/06 |
| | | | 709/225 |
| 2013/0097517 A1* | 4/2013 | Reiss | G06F 21/6218 |
| | | | 715/741 |
| 2013/0198274 A1 | 8/2013 | Papakipos et al. | |
| 2013/0318573 A1* | 11/2013 | Reunamaki | H04W 12/04 |
| | | | 726/4 |
| 2014/0068046 A1* | 3/2014 | Sakai | H04L 63/0884 |
| | | | 709/223 |
| 2014/0122873 A1* | 5/2014 | Deutsch | H04L 63/20 |
| | | | 713/158 |
| 2014/0130134 A1* | 5/2014 | Arora | G06F 21/629 |
| | | | 726/4 |
| 2014/0230018 A1* | 8/2014 | Anantharaman | H04L 63/0861 |
| | | | 726/4 |
| 2014/0365921 A1* | 12/2014 | Gupta | G06F 3/04812 |
| | | | 715/758 |

OTHER PUBLICATIONS

Langley, Adam "Probing the viability of TCP extensions", https://www.imperialviolet.org/binary/ecntest.pdf, as accessed Dec. 30, 2013, (Nov. 21, 2008).

Frenzel, Lou "What's the Difference Between ZigBee and Z-Wave?", http://electronicdesign.com/communications/what-s-difference-between-zigbee-and-z-wave, as accessed Dec. 30, 2013, (Mar. 29, 2012).

"Insteon", http://www.insteon.com, as accessed Dec. 30, 2013, (Feb. 23, 2001).

"D-Link", http://www.dlink.com/us/en, as accessed Dec. 30, 2013, (Jun. 29, 2012).

"Linksys", http://www.linksys.com/en-us/home, as accessed Dec. 30, 2013, (Feb. 15, 2013).

"Buffalo", http://www.buffalotech.com/products/network-storage, as accessed Dec. 30, 2013, (Nov. 5, 2006).

* cited by examiner

SYSTEMS AND METHODS FOR PROVIDING SECURE ACCESS TO LOCAL NETWORK DEVICES

BACKGROUND

Home networks are connecting an ever-increasing number of devices in the home, allowing home users to manage, operate, and automate a variety of home equipment, from entertainment devices to utility-connected devices. Unfortunately, configuring access to devices on a home network may be a challenging task for non-sophisticated users.

Some users may wish to provide guests in their homes with temporary access to some devices. However, providing guests with home network access and/or the local network address and password to access administrative interfaces of the devices may be burdensome for both the home owner and guest, as well as insecure. On the other hand, simply exposing a home device to the global Internet may open the device to attack by anyone.

Traditional approaches for providing access to devices on a home network such as Universal Plug and Play (UPnP) may offer too little control and security. Traditional approaches for controlling home network traffic, such as Internet Protocol (IP) forwarding, may be difficult for users to understand and properly configure.

Accordingly, the instant disclosure identifies and addresses a need for additional and improved systems and methods for providing secure access to local network devices.

SUMMARY

As will be described in greater detail below, the instant disclosure describes various systems and methods for providing secure access to local network devices based on permissions for accessing the devices set through identity assertion providers by validating requests to access the devices with shared secrets obtained through the identity assertion providers.

In one example, a computer-implemented method for providing secure access to local network devices may include (1) identifying a local area network that provides Internet connectivity to at least one device within the local area network, (2) obtaining, from an identity assertion provider, (i) a shared secret for authenticating the identity of a guest user of the device and (ii) a permission for the guest user to access the device from outside the local area network, (3) storing the shared secret and the permission within the local area network, (4) receiving, via the Internet connectivity, a request by the guest user from outside the local area network to access the device, and (5) providing access to the device in response to validating the request based on the shared secret and the permission.

In some examples, (1) storing the shared secret and the permission within the local area network may include storing the shared secret and the permission on a gateway that provides Internet connectivity to the local area network, (2) receiving the request may include receiving authentication information at the gateway, and (3) validating the request based on the shared secret and the permission may include validating the authentication information with the shared secret.

In some embodiments, (1) the identity assertion provider may include a social networking service provider and (2) the permission for the guest user to access the device from outside the local area network may have been enabled, via a social networking platform of the social networking service provider, by an owner of the local area network.

In some examples, receiving, via the Internet connectivity, the request by the guest user from outside the local area network to access the device may include receiving a message addressed to a port number assigned to the device on the local area network. In some embodiments, providing access to the device in response to validating the request is also based on geolocation data identifying a current location of a guest device from which the request was sent. In some examples, obtaining the shared secret and the permission from the identity assertion provider may be in response to authorizing the identity assertion provider to grant permissions on the local area network.

Another computer-implemented method for providing secure access to local network devices may include (1) receiving, on a social networking platform, a request by a first user of the social networking platform to provide a second user of the social networking platform with access to a device within a local area network controlled by the first user, (2) identifying an authentication system used for accessing the social networking platform, (3) provisioning the local area network with authentication information for authenticating the second user of the social networking platform via the authentication system, and (4) transmitting, in response to receiving the request by the first user, permission information from the social networking platform to the local area network that provides the second user with access to the device within the local area network controlled by the first user.

In some examples, receiving the request by the first user to provide the second user of the social networking platform with access to the device may include (1) identifying an event on the social networking platform that is hosted by the first user and to which the second user is invited and (2) determining, based at least in part on the second user being invited to the event, that the second user is entitled to access to the device.

In some embodiments, determining that the second user is entitled to access to the device may include determining that the second user is entitled to access to the device for a duration of the event as defined on the social networking platform. Additionally or alternatively, determining that the second user is entitled to access to the device may include (1) identifying a device type of the device, (2) identifying a role of the second user at the event, (3) identifying a mapping between device types and guest roles, and (4) determining, based on the device type, the role, and the mapping between device types and guest roles, that the role of the second user at the event entitles the second user to access to the device.

In some examples, receiving the request by the first user to provide the second user of the social networking platform with access to the device may include (1) identifying a relationship between the first user and the second user on the social networking platform and (2) determining, based on the relationship between the first user and the second user on the social networking platform, that the second user is entitled to access to the device.

In some embodiments, the device may provide a plurality of features and the permission information may specify whether the second user has permission to access each of the plurality of features of the device. In some examples, transmitting the permission information from the social networking platform to the local area network may include transmitting the permission information to reside on a gateway device of the local area network that receives Internet communications. Additionally or alternatively, transmitting the permission information from the social networking platform to the local area network may include transmitting the permission information to reside on the device.

In one embodiment, a system for implementing the above-described method may include (1) an identification module, stored in memory, that identifies a local area network that provides Internet connectivity to at least one device within the local area network, (2) an obtaining module, stored in memory, that obtains, from an identity assertion provider (i) a shared secret for authenticating the identity of a guest user of the device and (ii) a permission for the guest user to access the device from outside the local area network, (3) a storing module, stored in memory, that stores the shared secret and the permission within the local area network, (4) a receiving module, stored in memory, that receives, via the Internet connectivity, a request by the guest user from outside the local area network to access the device, (5) a providing module, stored in memory, that provides access to the device in response to validating the request based on the shared secret and the permission, and (6) at least one physical processor that executes the identification module, the obtaining module, the storing module, the receiving module, and the providing module.

In some examples, one or more of the above-described methods may be encoded as computer-readable instructions on a non-transitory computer-readable medium.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
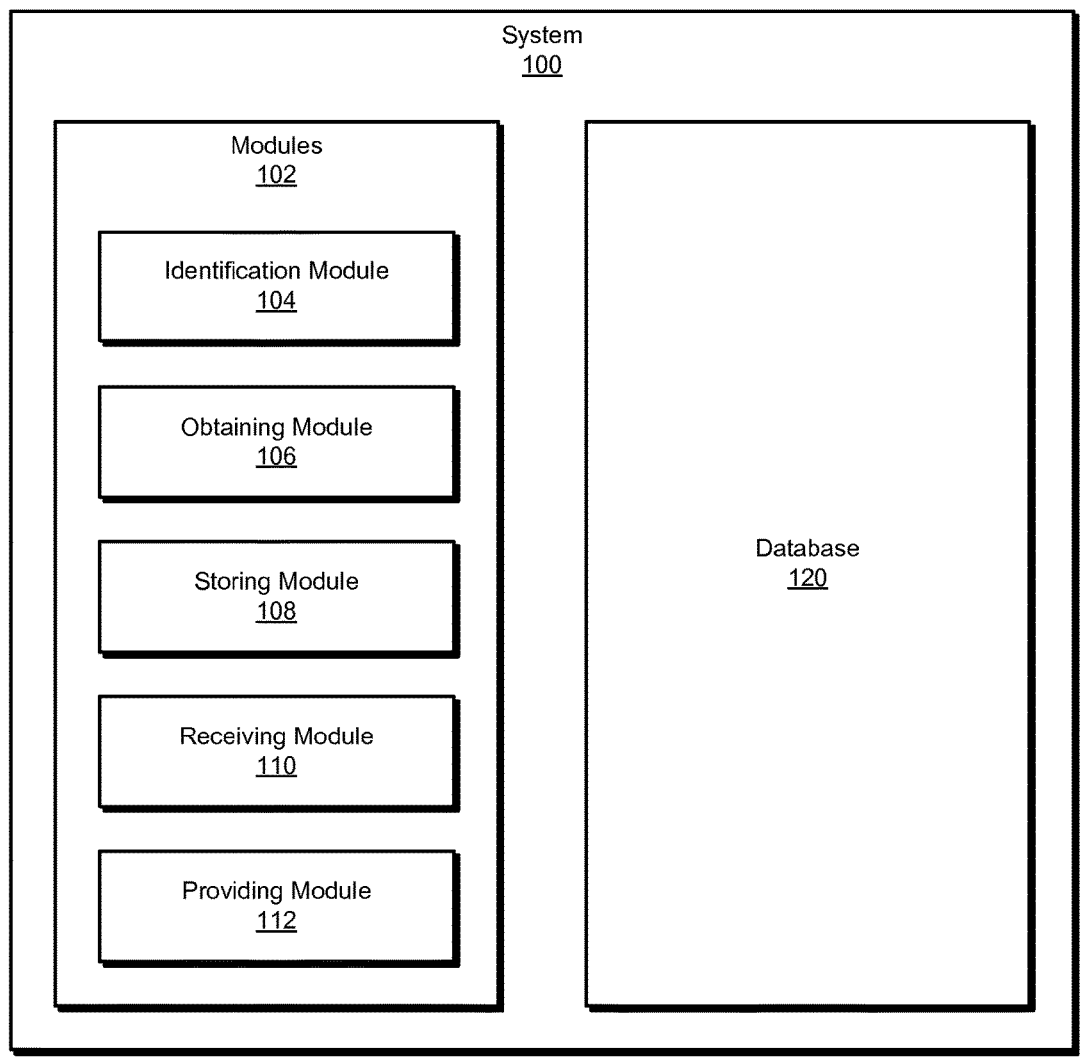
FIG. 1 is a block diagram of an exemplary system for providing secure access to local network devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for providing secure access to local network devices. As will be explained in greater detail below, by validating requests to access devices on local area networks based on permissions for accessing the devices obtained through identity assertion providers and based on shared secrets obtained through the identity assertion providers, the systems and methods described herein may allow home network owners to securely provide granular device access to guests. Additionally, in some examples the identity assertion providers may include (and/or provide authentication services for) social networking platforms. In these examples, the systems and methods described herein may enable home network owners to provide device access to social networking contacts.

Figure 2:
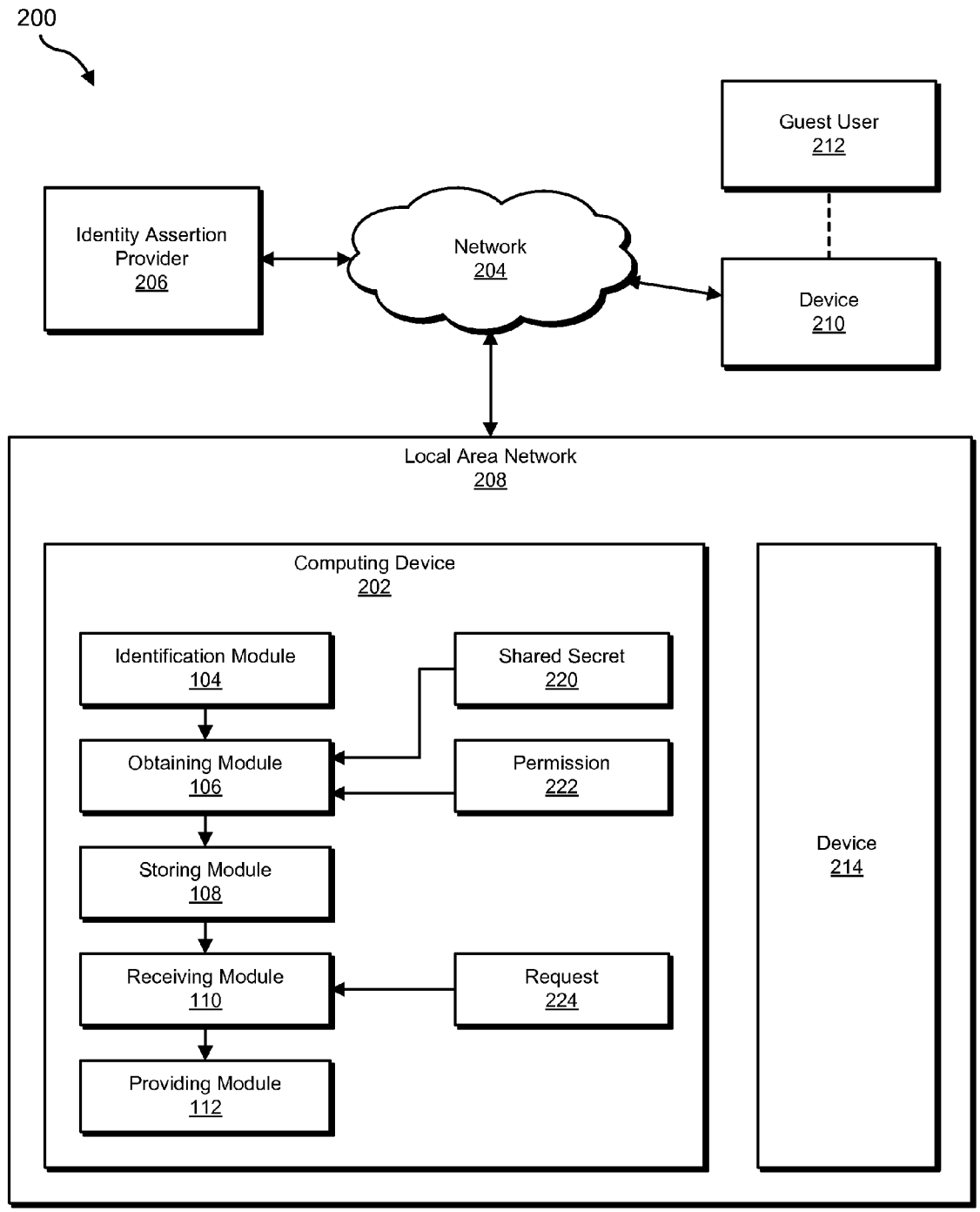
FIG. 2 is a block diagram of an additional exemplary system for providing secure access to local network devices.
Figure 4:
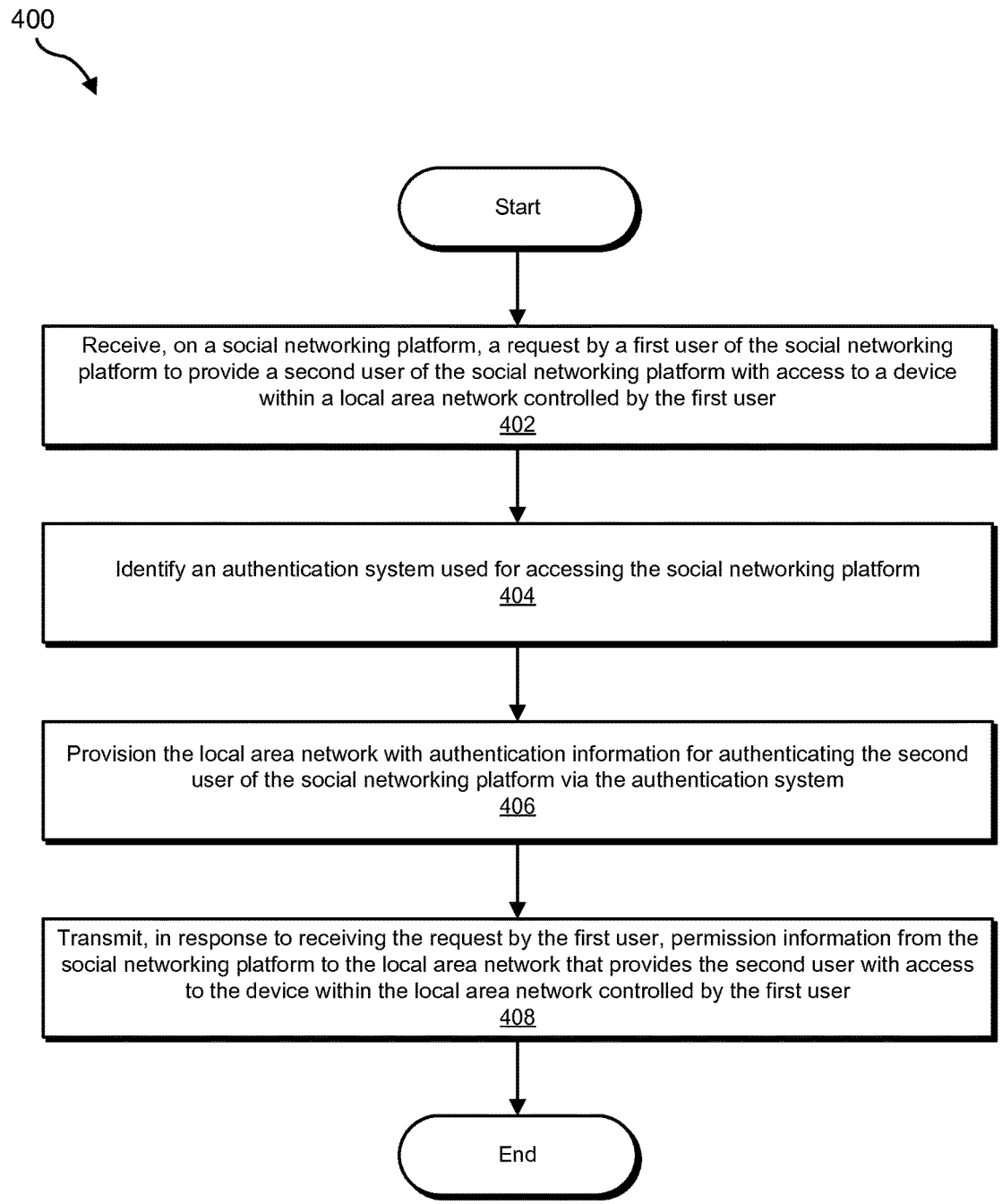
FIG. 4 is a flow diagram of an exemplary method for providing secure access to local network devices.
Figure 5:
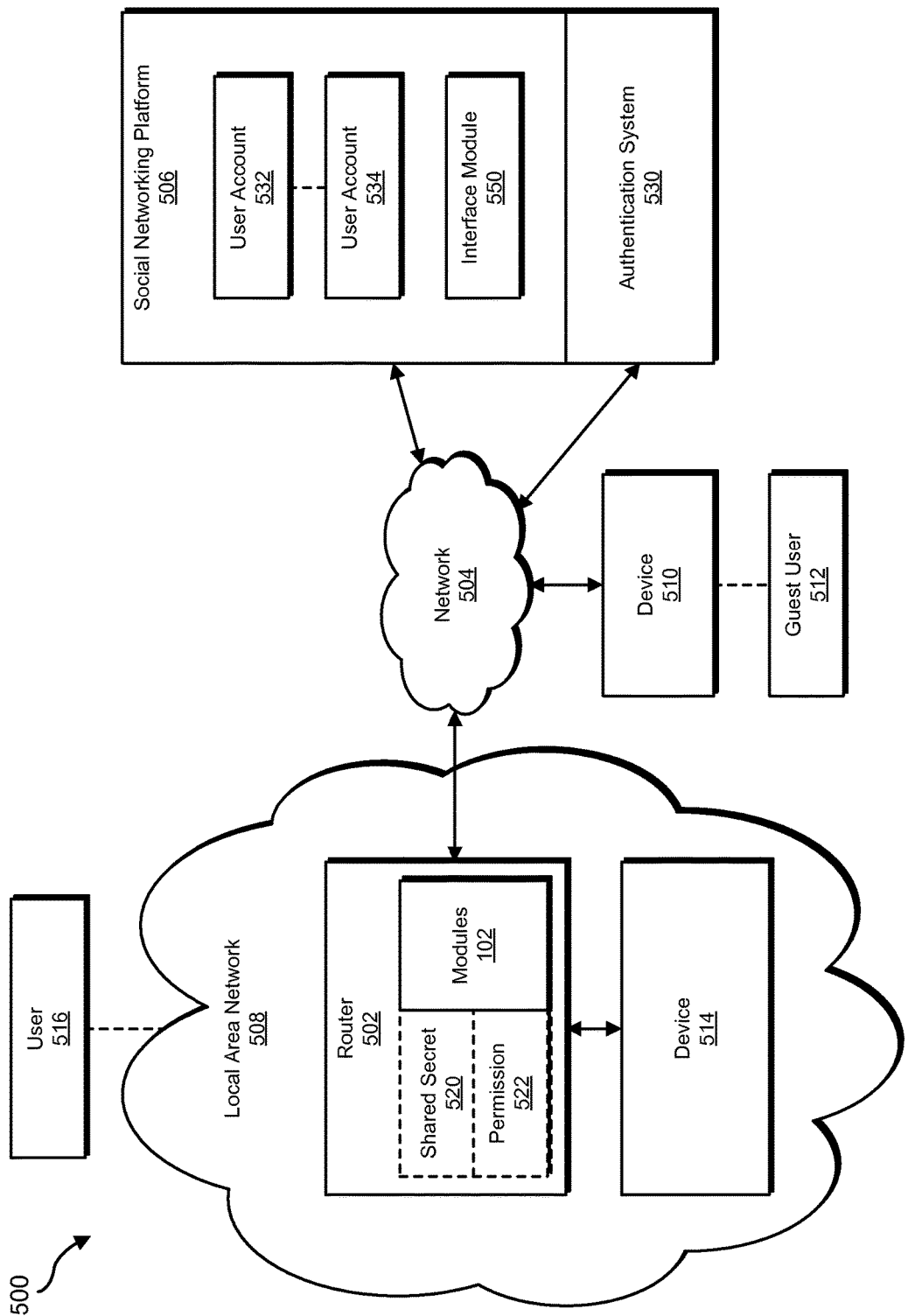
FIG. 5 is a block diagram of an additional exemplary system for providing secure access to local network devices.

The following will provide, with reference to FIGS. 1, 2, and 5, detailed descriptions of exemplary systems for providing secure access to local network devices. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for providing secure access to local network devices. As illustrated in this figure, exemplary system 100 may include one or more modules 102 for performing one or more tasks. For example, and as will be explained in greater detail below, exemplary system 100 may include an identification module 104, stored in memory, that identifies a local area network that provides Internet connectivity to at least one device within the local area network, (2) an obtaining module 106, stored in memory, that obtains, from an identity assertion provider (i) a shared secret for authenticating the identity of a guest user of the device and (ii) a permission for the guest user to access the device from outside the local area network, (3) a storing module 108, stored in memory, that stores the shared secret and the permission within the local area network, (4) a receiving module 110, stored in memory, that receives, via the Internet connectivity, a request by the guest user from outside the local area network to access the device, and (5) a providing module 112, stored in memory, that provides access to the device in response to validating the request based on the shared secret and the permission. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, identity assertion provider 206, device 210, and/or device 214), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store one or more shared secrets for authentication with an identity assertion provider and/or one or more permissions regulating access to devices connected to a local area network.

Database 120 may represent portions of a single database or computing device or a plurality of databases or computing devices. For example, database 120 may represent a portion of computing device 202, device 214, and/or local area network 208 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as device 214 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in a local area network 208 that is in communication with an identity assertion provider 206 and a device 210 via a network 204. In one example, computing device 202 may be programmed with one or more of modules 102 and/or may store all or a portion of the data in database 120. Additionally or alternatively, device 214 may be programmed with one or more of modules 102 and/or may store all or a portion of the data in database 120.

In one embodiment, one or more of modules 102 from FIG. 1 may, when executed by at least one processor of computing device 202 and/or device 214, enable computing device 202 and/or device 214 to provide secure access to device 214 (e.g., to a guest user 212 using a device 210). For example, and as will be described in greater detail below, one or more of modules 102 may cause computing device 202 and/or device 214 to (1) identify local area network 208 that provides Internet connectivity (e.g., connectivity to and/or via network 204) to at least one device (e.g., device 214) within local area network 208, (2) obtain, from identity assertion provider 206, (i) a shared secret 220 for authenticating the identity of guest user 212 of device 214 and (ii) a permission 222 for guest user 212 to access device 214 from outside local area network 208 (e.g., via device 210 connected to network 204), (3) store shared secret 220 and permission 222 within local area network 208, (4) receive, via the Internet connectivity, a request 224 by guest user 212 from outside local area network 208 (e.g., via device 210 and network 204) to access device 214, and (5) provide access to device 214 in response to validating request 224 based on shared secret 220 and permission 222.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device. In some examples, computing device 202 may represent a gateway and/or router of local area network 208 that directs Internet traffic to and from local area network 208.

Identity assertion provider 206 generally represents any type or form of computing device, platform, and/or service that is capable of facilitating the authentication of users. Identity assertion provider 206 may include one or more application servers and/or database servers configured to provide various database services and/or run certain software applications. In some examples, identity assertion provider 206 may include a social networking platform and/or provide authentication for a social networking platform.

Device 210 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Device 214 generally represents any type or form of device capable of interfacing with a local area network. Examples of device 214 include, without limitation, home automation devices, home entertainment devices, home security devices, desktops, servers, multimedia players, embedded systems, gaming consoles, combinations of one or more of the same, exemplary computing system 610 in FIG. 6, or any other suitable computing device.

Network 204 generally represents any medium or architecture capable of facilitating communication or data transfer. Examples of network 204 include, without limitation, the Internet, a Wide Area Network (WAN), Power Line Communications (PLC), a cellular network (e.g., a Global System for Mobile Communications (GSM) network), a Local Area Network (LAN), a Personal Area Network (PAN), an intranet, exemplary network architecture 700 in FIG. 7, or the like. Network 204 may facilitate communication or data transfer using wireless or wired connections. In one embodiment, network 204 may facilitate communication between local area network 208, identity assertion provider 206, and device 210.

Figure 3:
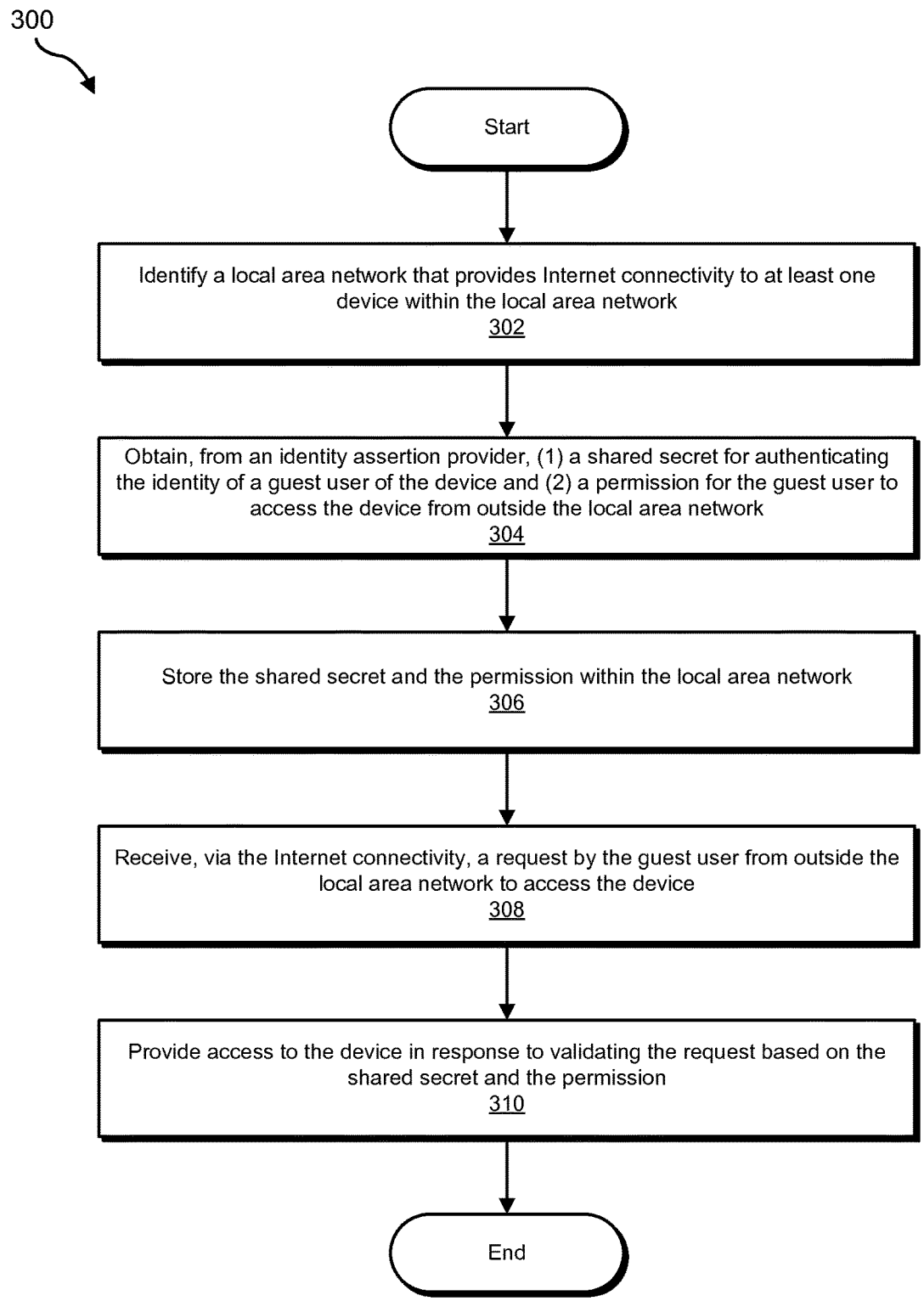
FIG. 3 is a flow diagram of an exemplary method for providing secure access to local network devices.

FIG. 3 is a flow diagram of an exemplary computer-implemented method 300 for providing secure access to local network devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a local area network that provides Internet connectivity to at least one device within the local area network. For example, identification module 104 may, as part of computing device 202 in FIG. 2, identify local area network 208 that provides Internet connectivity (e.g., connectivity to and/or via network 204) to at least one device (e.g., device 214) within local area network 208.

The local area network may include a network at any of a variety of sites. For example, the local area network may include a home network, an office network, a business network (e.g., a network for a hotel) and/or any other network with connected devices to which a network owner and/or administrator may wish to grant a guest access.

The device may include any type or form of device capable of interfacing with a local area network. For example, the device may include a home automation device (e.g., to control one or more lights and/or heating, ventilation, and/or air conditioning systems). In some examples, the device may include a home security device (e.g., to control one or more locks, doors, garage doors, motion sensors, door and/or window sensors, and/or alarms). Additionally or alternatively, the device may include a multimedia device (e.g., audio and/or video devices, cameras, etc.).

The local area network may provide Internet connectivity to the device in any suitable manner. For example, the local area network may provide Internet connectivity to the device by means of a gateway within the local area network. As used herein, the term "gateway" may refer to a gateway, a router, and/or any other networking device that may connect a local area network to the Internet, that may filter and/or direct incoming traffic to a local area network, and/or that may provide connectivity to the device within the local area network. In some examples, the local area network may provide Internet connectivity to the device by forwarding external Internet Protocol (IP) requests to the device (e.g., based on a port specified in the IP request).

Identification module 104 may identify the local area network in any suitable context. For example, identification module 104 may execute on a gateway device for the local area network. In this example, identification module 104 may identify the local area network by executing on the gateway device.

As illustrated in FIG. 3, at step 304 one or more of the systems described herein may obtain, from an identity assertion provider, (i) a shared secret for authenticating the identity of a guest user of the device and (ii) a permission for the guest user to access the device from outside the local area network. For example, obtaining module 106 may, as part of computing device 202 in FIG. 2, obtain, from identity assertion provider 206, (i) shared secret 220 for authenticating the identity of guest user 212 of device 214 and (ii) permission 222 for guest user 212 to access device 214 from outside local area network 208 (e.g., via device 210 connected to network 204).

As used herein, the phrase "identity assertion provider" may refer to any entity, service, and/or platform that is capable of facilitating the authentication of users. In some examples, the identity assertion provider may provide federated identity management. For example, the identity assertion provider may provide a single sign-on (SSO) service for authenticating users across multiple services. The identity assertion provider may use any of a variety of standards and/or protocols to provide authentication services. For example, the identity assertion provider may use OAUTH, Security Assertion Markup Language (SAML), and/or OPENID. In some examples, the identity assertion provider may include and/or may provide authentication services for a social networking platform. Examples of identity assertion providers may include, without limitation, GOOGLE, FACEBOOK, and SYMANTEC O3.

As used herein, the phrase "social networking platform" may refer to any computing device and/or devices, software framework, and/or combination thereof usable for providing and/or hosting a social networking service (e.g., via the Internet). As used herein, the phrase "social networking service" may refer to any service and/or Internet site that manages social connections and/or shares, compiles, formats, and/or broadcasts information based on social connections. Examples of social networking platforms may include FACEBOOK, TWITTER, LINKEDIN, and GOOGLE+. In some examples, the online service may host data and/or process the data via cloud-based applications (e.g., web-based email clients, online calendar applications, online picture albums, etc.) for personal and/or private use.

As used herein, the phrase "shared secret" may refer to any data that may include an authentication token and/or that may be used to generate and/or verify an authentication token. As used herein, the phrase "authentication token" may refer to any data that may authenticate the identity of a user and/or the validity of a request issued by a user.

As used herein, the term "permission" may refer to any rule and/or criterion for determining access to a device and/or service provided by a device. For example, a permission may specify what user is allowed access to a device, under what circumstances the user is allowed access to the device, and/or what level of access to the device the user is allowed. In some examples, the permission may specify that a user is allowed access to the device based on a characteristic of the user (e.g., that the user belongs to a specified group, has a specified role, etc.) and/or based on a characteristic of the device (e.g., the device is a lighting device). In some examples, the permission may apply to a group of users and/or a group of devices.

Obtaining module 106 may obtain the shared secret and the permission in any suitable context. For example, obtaining module 106 may obtain the shared secret and the permission from the identity assertion provider in response to authorizing the identity assertion provider to grant permissions on the local area network. For example, obtaining module 106 may operate as a part of a networked device on the local area network (e.g., a gateway and/or a device to be accessed by a guest). In this example, an administrator of the local area network (e.g., a home owner) may instruct obtaining module 106 to trust the identity assertion provider (e.g., and accept permissions and authentication information from the identity assertion provider). Additionally or alternatively, obtaining module 106 may be pre-configured to interoperate with the identity assertion provider.

FIG. 4 illustrates an exemplary method 400 that provides an example of the context in which obtaining module 106 may obtain the shared secret and the permission. As shown in FIG. 4, at step 402 one or more of the systems described herein may receive, on a social networking platform, a request by a first user of the social networking platform to provide a second user of the social networking platform with access to a device within a local area network controlled by the first user.

FIG. 5 illustrates an exemplary system 500 for providing secure access to local network devices. FIG. 5 may provide an example to illustrate the methods depicted in FIG. 3 and FIG. 4. As shown in FIG. 5, system 500 may include a network 504 that connects a local area network 508 (e.g., owned, administrated, and/or controlled by a user 516) with a social networking platform 506, an authentication system 530, and a device 510 (e.g., owned and/or used by a guest user 512). In one example, user 516 may wish to provide guest user 512 with access to a device 514 within local area network 508. In this example, a router 502 of local area network 508 may be configured with modules 102. Social networking platform 506 may be configured with an interface module 550 (e.g., an application for the social networking platform that facilitates providing access to devices via user accounts on the social networking platform). Accordingly, router 502 may be configured to interface with social networking platform 506 and/or authentication system 530 to facilitate user 516 in providing guest user 512 with access to device 514. For example, user 516 may have a user account 532 on social networking platform 506 and guest user 512 may have a user account 534 on social networking platform 506. User 516 may initiate a request through social networking platform 506 (by way of user account 532) to provide guest user 512 (by way of user account 534) with access to device 514 (e.g., by associating local area network 508, router 502, and/or device 514 with user account 532 and associating the requested access with user account 534).

The social networking platform may receive the request to provide the second user access to the device in any of a variety of ways. For example, interface module 550 within the social networking platform may provide an interface (e.g., via an application hosted by the social networking platform) that allows for the first user to select from a list of users (e.g., friends and/or contacts on the social network) and to select the device in the local area network (e.g., that has been registered with the social networking platform). Additionally or alternatively, interface module 550 may allow the first user to request access for the second user through another feature of the social networking platform. For example, interface module 550 may allow the first user to request access to the device for the second user by inviting the second user to an event (e.g., at the site of the local area network, such as the first user's home). For example, interface module 550 may identify an event on the social networking platform that is hosted by the first user and to which the second user is invited. Interface module 550 may then determine, based at least in part on the second user being invited to the event, that the second user is entitled to access the device.

In some examples, interface module 550 may determine that the second user is entitled to access the device only after fulfilling one or more additional conditions. For example, interface module 550 may determine that the second user is entitled to access the device if the second user accepts the invitation via the social networking platform. In one example, interface module 550 may determine that the second user is entitled to access the device for a duration of the event as defined on the social networking platform. For example, if the event as defined on the social networking platform is for 6:00 pm to 10:00 pm, interface module 550 may determine that the second user is entitled to access the device from 6:00 pm to 10:00 pm (or, e.g., from 5:45 pm to 10:15 pm, to allow for a grace period).

In some examples, interface module 550 may determine that the second user is entitled to access the device (e.g., during the event) based on (1) identifying a device type of the device, (2) identifying a role of the second user at the event, (3) identifying a mapping between device types and guest roles, and (4) determining, based on the device type, the role, and the mapping between device types and guest roles, that the role of the second user at the event entitles the second user to access to the device. For example, interface module 550 may determine that any invited guest may access lighting devices at the event, but that a guest with a "disc jockey" role is also entitled access to multimedia devices at the event. In some examples, interface module 550 may use defined relationships within the social networking platform to determine default access permissions for guests to devices within the local area network. For example, a guest with an "immediate family" relationship to the first user defined in the social network may be granted access privileges to more devices (and/or to more device features) than a guest with a "friend of a friend" relationship to the first user. Accordingly, interface module 550 may identify a relationship between the first user and the second user on the social networking platform and determine, based on the relationship between the first user and the second user on the social networking platform, that the second user is entitled to access to the device.

Although interface module 550 may operate as a part of a social networking platform, in some examples interface module 550 may operate as a part of a portal (e.g., with one or more associated web services) that may provide an administrator of a local area network with an interface in which to define user accounts, user groups, and/or access policies (e.g., types of access, conditions for access, and/or devices which may be accessed by the defined user accounts and/or user groups). In some examples, the portal may enable a first user to provide access to a device on a local area network to a second user without involving a social networking platform.

Returning to FIG. 4, at step 404 one or more of the systems described herein may identify an authentication system used for accessing the social networking platform. For example, interface module 550 may, as a part of social networking platform 506 in FIG. 5, identify an authentication system 530 used for accessing social networking platform 506.

In some examples, the authentication system may provide federated identity management. For example, the identity assertion provider may provide a single sign-on (SSO) service for authenticating users across multiple services. The authentication system may use any of a variety of standards and/or protocols to provide authentication services. For example, the identity assertion provider may use OAUTH, Security Assertion Markup Language (SAML), and/or OPENID.

Interface module 550 may identify the authentication system in any suitable manner. For example, interface module 550 may identify the authentication system by operating as a part of the social networking platform that uses and/or provides the authentication system. Additionally or alternatively, interface module 550 may identify the authentication system by identifying and/or using an application programming interface (API) for interfacing with the authentication system.

Returning to FIG. 4, at step 406 one or more of the systems described herein may provision the local area network with authentication information for authenticating the second user of the social networking platform via the authentication system. For example, interface module 550 may, as a part of social networking platform 506 in FIG. 5, provision local area network 508 with authentication information (e.g., retrieved from authentication system 530) for authenticating guest user 512 (e.g., associated with user account 534) via authentication system 530. For example, interface module 550 may provide router 502 of local area network 508 with shared secret 520. In some examples, interface module 550 may provision local area network 508 with the authentication information by instructing authentication system 530 to provide the authentication information to router 502.

Interface module 550 may provision the local area network with the authentication information in any suitable context. In some examples, interface module 550 may provision the local area network with the authentication information when the second user is first identified as a candidate for receiving permissions to access devices on the local area network (e.g., before receiving the current request to access the device). Additionally or alternatively, interface module 550 may provision the local area network with the authentication information following the request to provide the second user with access to the device.

Returning to FIG. 4, at step 408 one or more of the systems described herein transmit, in response to receiving the request by the first user, permission information from the social networking platform to the local area network that provides the second user with access to the device within the local area network controlled by the first user. For example, interface module 550 may, as a part of social networking platform 506 in FIG. 5, transmit, in response to receiving the request by user 516, a permission 522 from social networking platform 506 to local area network 508 (e.g., to router 502 within local area network 508) that provides guest user 512 with access to device 514 within local area network 508.

Although shared secret 520 and permission 522 are shown as being stored at router 502 in FIG. 5, in some examples shared secret 520 and/or permission 522 may be stored at another location for access by local area network 508. For example, shared secret 520 and/or permission 522 may be stored at device 514, such that an attempt to access device 514 by guest user 512 is validated at device 514 instead of and/or in addition to being validated at router 502.

Returning to the discussion of step 304 in FIG. 3, obtaining module 106 may obtain the shared secret and the permission when the identity assertion provider (e.g., the social networking platform) transmits the shared secret and the permission to the local area network. For example, the identity assertion provider may push the shared secret and/or the permission to a gateway of the local area network via a representational state transfer (REST) API. Additionally or alternatively, obtaining module 106 may fetch the shared secret and/or permission from a predefined source (e.g., via a REST API), such as the identity assertion provider and/or an associated social networking platform.

Returning to FIG. 3, at step 306 one or more of the systems described herein may store the shared secret and the permission within the local area network. For example, storing module 108 may, as part of computing device 202 in FIG. 2, store shared secret 220 and permission 222 within local area network 208.

Storing module 108 may store the shared secret and the permission within the local area network in any suitable manner. For example, storing module 108 may store the shared secret and/or the permission on a gateway of the local area network. Additionally or alternatively, storing module 108 may store the shared secret and/or the permission of the gateway on the device to which the guest user is to be granted access.

At step 308 one or more of the systems described herein may receive, via the Internet connectivity, a request by the guest user from outside the local area network to access the device. For example, receiving module 110 may, as part of computing device 202 in FIG. 2, receive, via the Internet connectivity, request 224 by guest user 212 from outside local area network 208 (e.g., via device 210 and network 204) to access device 214.

The request may include any of a variety of information. For example, the request may include authentication information (e.g., an authentication token) for authenticating the request (e.g., as originating from the guest user). The authentication information may come in any of a variety of formats. For example, the authentication information may be presented as a port knocking sequence (e.g., a series of requests at a specified sequence of ports at the IP address of the local area network). Additionally or alternatively, the authentication information may come via the Transmission Control Protocol Authentication Option (TCP-AO). In some examples, the request may include a hash-based message authentication code (HMAC) for authenticating the guest user.

In some examples, the request may include an identification of the guest user. Additionally or alternatively, the request may include geolocation information specifying a current location of the guest user (e.g., by specifying a current location of a device that is carried by the guest user and/or that was used by the guest user to send the request). In some examples, receiving module 110 may identify the IP address from which the request originated (e.g., to compare the IP address with information from the identity assertion provider and/or an associated social networking platform about a current IP address from which the guest user is in communication with the identity assertion provider). In some examples, receiving module 110 may receive the request by receiving a message addressed to a port number assigned to the device on the local area network.

Receiving module 110 may receive the request in any suitable context. For example, the guest user may have authenticated with the identity assertion provider, which may in turn have submitted the request on behalf of the guest user. Additionally or alternatively, the guest user may have authenticated with the identity assertion provider, which may have in turn provided a token (e.g., as an assertion of the identity of the guest user) to the guest user and/or to receiving module 110. In some examples, the guest user may have been redirected to the identity assertion provider upon attempting to access the device in order to first authenticate with the identity assertion provider. In one example, the guest user may have initiated the request via a social networking platform application. In this example, the social networking application may have also provided, to the guest user, the IP address, dynamic domain name, and/or port needed to access the device within the local area network.

Returning to FIG. 3, at step 310 one or more of the systems described herein may provide access to the device in response to validating the request based on the shared secret and the permission. For example, providing module 112 may, as part of computing device 202 in FIG. 2, provide access to device 214 in response to validating request 224 based on shared secret 220 and permission 222.

Providing module 112 may validate the request in any of a variety of ways. For example, providing module 112 may determine that authentication information provided in the request is valid based on the shared secret. In some examples, providing module 112 may also inspect the permission to determine that the guest user is entitled access to the device. Additionally or alternatively, providing module 112 may inspect the permission and the request to determine that the guest user is entitled to access a requested feature of the device and/or to interact with the device in a way that is specified by the request. In some examples, providing module 112 may also validate the request based on additional information (e.g., received with the request). For example, providing module 112 may validate the request based on geolocation data identifying a current location of a guest device from which the request was sent. For example, providing module 112 may validate the request based on the geolocation data indicating that the request was sent from the physical site of the local area network and/or a physical site associated with the local area network (e.g., property boundaries within which the local area network falls).

Providing module 112 may provide access to the device in any suitable manner. For example, providing module 112 may forward the request to the device (e.g., instead of blocking, filtering, and/or redirecting the request) in response to validating the request.

In one example, a social networking application (e.g., a FACEBOOK application) may enable a user to configure guest access to resources in a protected local network. The social networking application may also provide, to configured guests, the IP address, dynamic domain name, and/or port needed to access each protected resource within the protected local network. The router of the protected network may interface with the social networking application to know what guests should be allowed which types of access to which devices and under what circumstances. When the router receives a request on one of the provided ports it can use the social networking application to discover if the incoming request matches the IP address for a configured guest user (e.g., who may be logged in to the social network) and may allow or deny the requested access.

In some examples, the systems described herein may consider the physical location of the guest—only granting access to some resources when the guest is physically on the site of the local area network (or, conversely, only when the guest is physically off the site of the local area network). These systems may use an authentication scheme (such as TCP-AO) to communicate the level of access that has been granted. Alternatively, the level of access to the resource may depend on what the resource exposes (e.g., a streaming camera may by default show streaming content; beyond streaming, these systems may also grant access to change the orientation and/or zoom level of the camera).

The interfaces available to a social networking application (or another identity provider) may provide the IP addresses (and, in some examples, geolocation information) for known logged in users. In addition to allowing different levels of access to devices, the systems described herein may specify the conditions under which access is granted. In some examples, these conditions may be tied to events on the calendar of a social networking platform. For example, these systems may make a default level of access for a scheduled birthday event available to all invited users on the social networking platform who accepted the invitation (and, e.g., are physically present according to the geo-location status of the users). In some examples, the access may be granted for the duration of the event (e.g., as specified on the calendar of the social networking platform). In some cases, these systems may also consider specific roles designated for the invited guests (e.g., as specified on the social networking platform) when assigning default levels of access to devices. For example, these systems may grant a user designated as a "DJ" with access to resources to control music and/or video around the house.

In some examples, these systems may tie certain types of events to specific levels of access for guests of the events. For example, these systems may automatically grant house guests at a vacation home with access to control lights, thermostats, audio-visual equipment, and swimming pool heat by booking a guest stay at the vacation home via the social networking platform. In some examples, these systems may also send preset commands to devices in anticipation of a guest's arrival (e.g., because the guest is scheduled to arrive and/or because geolocation data indicates that the guest is in close proximity), such as warming up the house or disarming a security system.

The systems described herein may make the list of allowed users (along with permissions and duration of access) to the protected network's gateway in any of a variety of ways. For example, these systems may push the guest list and configuration to the router (e.g., via a REST API) or the router may fetch it from a configured source (e.g., via a REST API or through a linked identity provider and/or social networking platform). In some examples, these systems may use port knocking at the designated IP address to allow access. Additionally or alternatively, these systems may use TCP-AO to indicate authentication status (and, e.g., to specify granular permissions) through to the networked device.

The systems described herein may specify types and conditions of access by user and/or by groupings and/or categories of users. These systems may provide default access types and conditions for all granted users, for particular categories of users (e.g., close friends, relatives, immediate family, etc.) and/or for specified individual users. In some examples, these systems may apply default access types and conditions to guests of a specified event. These systems may also individuate types and conditions of access by the type of device (e.g., access to a web cam may be streaming only when remote but may allow panning, zooming, and snapshots when on site).

The systems described herein may identify policies that specify default access types and conditions and the devices to which they apply in connection with an established authentication link between the router of the protected network and the social networking application.

In some examples, a portal (with associated web services) may provide an administrator of a protected network with an interface in which to define user accounts, user groups, and policies (e.g., types of and conditions for access). The associated web services may provide the router with interfaces to query for IP addresses of logged in guests and/or fetch policies associated with guests. The router may then grant or deny access to devices accordingly.

Figure 6:
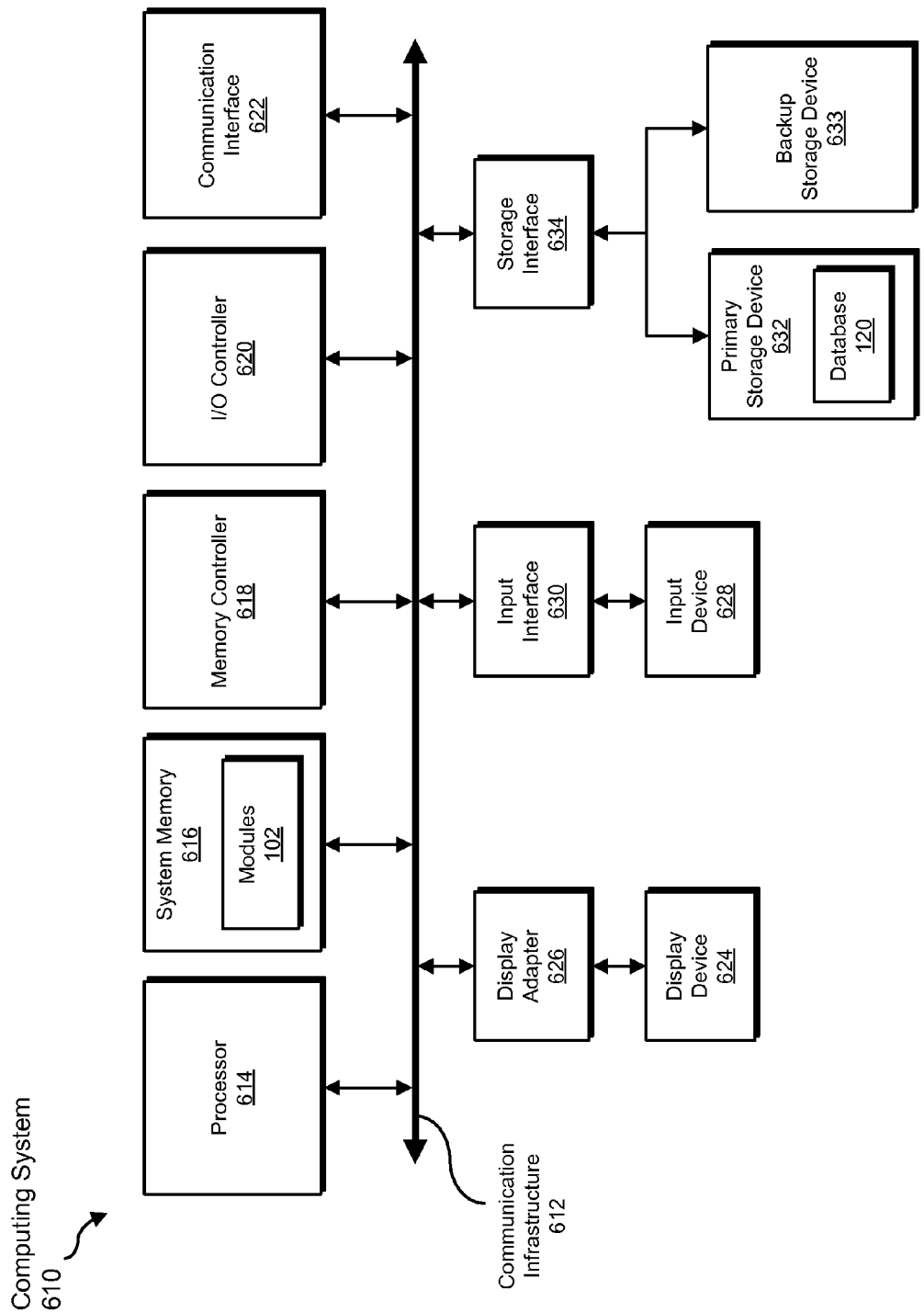
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and/or other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, and/or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, and/or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
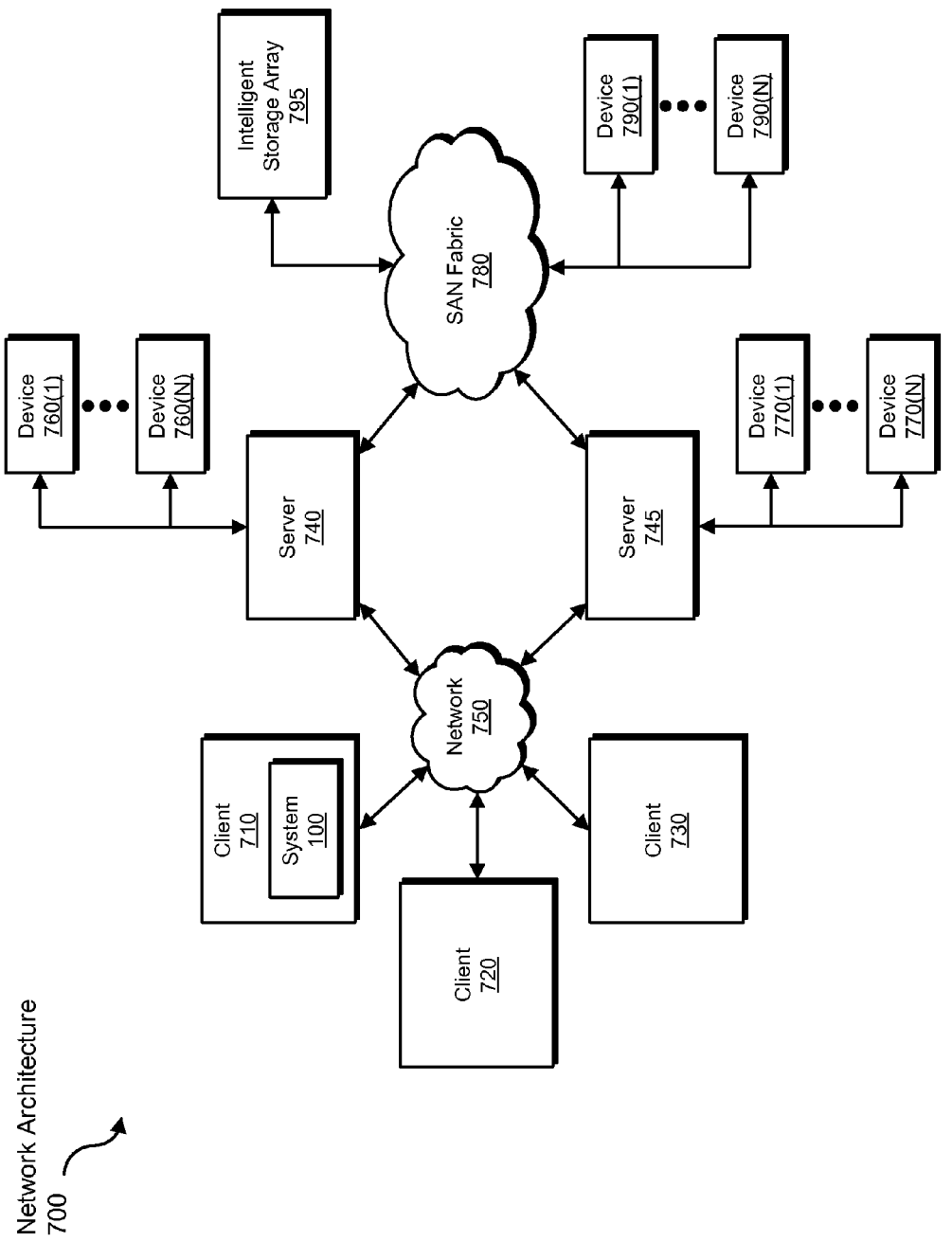
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and intelligent storage array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), and/or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for providing secure access to local network devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a permission to be transformed, transform the permission into an access configuration for a local area network, output a result of the transformation to a device within the local area network, use the result of the transformation to provide a guest user access to the device within the local area network, and store the result of the transformation within the local area network. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for providing secure access to local network devices, at least a portion of the method being performed by a computing device comprising at least one processor, the method comprising:
    identifying a local area network that provides Internet connectivity to at least one device within the local area network;
    obtaining, from a social networking platform operating as an identity assertion provider, in response to authorizing the identity assertion provider to grant permissions on the local area network:
        a shared secret for authenticating the identity of a guest user of the device; and
        a permission for the guest user to access the device from outside the local area network, the permission specifying the guest user as being allowed to access the device, wherein the social networking platform provides the permission based on a configuration set by an owner of the device to provide the permission in light of a relationship between the owner of the device and the guest user on the social networking platform;
    storing the shared secret and the permission within the local area network;
    receiving, via the Internet connectivity, a request by the guest user from outside the local area network to access the device by receiving a message addressed to a port number assigned to the device on the local area network; and
    providing control of the device from outside the local area network to the guest user according to the permission in response to validating the request based on the shared secret and the permission.

2. The computer-implemented method of claim 1, wherein:
    storing the shared secret and the permission within the local area network comprises storing the shared secret and the permission on a gateway that provides Internet connectivity to the local area network;
    receiving the request comprises receiving authentication information at the gateway;
    validating the request based on the shared secret and the permission comprises validating the authentication information with the shared secret.

3. The computer-implemented method of claim 1, wherein:
    the permission for the guest user to access the device from outside the local area network was enabled via the social networking platform of the social networking service provider by the owner.

4. The computer-implemented method of claim 1, wherein receiving, via the Internet connectivity, the request by the guest user from outside the local area network to access the device comprises receiving a message addressed to a port number assigned to the device on the local area network.

5. The computer-implemented method of claim 1, wherein providing access to the device in response to validating the request is also based on geolocation data identifying a current location of a guest device from which the request was sent.

6. The computer-implemented method of claim 1, wherein obtaining the shared secret and the permission from the identity assertion provider is in response to authorizing the identity assertion provider to grant permissions on the local area network.

7. The computer-implemented method of claim 1, wherein the social networking platform provides the permission based on having received a request by the owner to provide the guest user with access to the device.

8. The computer-implemented method of claim 1, wherein the social networking platform provides the permission based on: identifying an event, on the social networking platform, that is hosted by the owner and to which the guest user is invited;
    determining, based at least in part on the guest user being invited to the event, that the guest user is entitled to access the device.

9. The computer-implemented method of claim 8, wherein determining that the guest user is entitled to access the device comprises determining that the guest user is entitled to access the device for a duration of the event as defined on the social networking platform.

10. The computer-implemented method of claim 8, wherein determining that the guest user is entitled to access the device comprises: identifying a device type of the device;
    identifying a role of the guest user at the event;
    identifying a mapping between device types and guest roles;
    determining, based on the device type, the role, and the mapping between device types and guest roles, that the role of the guest user at the event entitles the guest user to access the device.

11. The computer-implemented method of claim 1, wherein the social networking platform provides the permission based on: identifying a relationship between the owner and the guest user on the social networking platform;
    determining, based on the relationship between the owner and the guest user on the social networking platform, that the guest user is entitled to access the device.

12. The computer-implemented method of claim 1, wherein: the device provides a plurality of features;
    the permission specifies whether the guest user has permission to access each of the plurality of features of the device.

13. A system for providing secure access to local network devices, the system comprising:
    an identification module, stored in memory, that identifies a local area network that provides Internet connectivity to at least one device within the local area network;

an obtaining module, stored in memory, that obtains, from a social networking platform operating as an identity assertion provider, in response to authorizing the identity assertion provider to grant permissions on the local area network:
- a shared secret for authenticating the identity of a guest user of the device; and
- a permission for the guest user to access the device from outside the local area network, the permission specifying the guest user as being allowed to access the device, wherein the social networking platform provides the permission based on a configuration set by an owner of the device to provide the permission in light of a relationship between the owner of the device and the guest user on the social networking platform;

a storing module, stored in memory, that stores the shared secret and the permission within the local area network;

a receiving module, stored in memory, that receives, via the Internet connectivity, a request by the guest user from outside the local area network to access the device by receiving a message addressed to a port number assigned to the device on the local area network;

a providing module, stored in memory, that provides control of the device from outside the local area network to the guest user according to the permission in response to validating the request based on the shared secret and the permission; and at least one physical processor that executes the identification module, the obtaining module, the storing module, the receiving module, and the providing module.

14. The system of claim 13, wherein:
the storing module stores the shared secret and the permission within the local area network by storing the shared secret and the permission on a gateway that provides Internet connectivity to the local area network;
the receiving module receives the request by receiving authentication information at the gateway;
the providing module validates the request based on the shared secret and the permission by validating the authentication information with the shared secret.

15. The system of claim 13, wherein:
the permission for the guest user to access the device from outside the local area network was enabled via the social networking platform of the social networking service provider by the owner.

16. The system of claim 13, wherein the receiving module receives, via the Internet connectivity, the request by the guest user from outside the local area network to access the device by receiving a message addressed to a port number assigned to the device on the local area network.

17. The system of claim 13, wherein the providing module provides access to the device in response to validating the request additionally based on geolocation data identifying a current location of a guest device from which the request was sent.

18. The system of claim 13, wherein the obtaining module obtains the shared secret and the permission from the identity assertion provider in response to authorizing the identity assertion provider to grant permissions on the local area network.

* * * * *